(12) United States Patent  
Shin et al.

(10) Patent No.: US 8,473,203 B2  
(45) Date of Patent: Jun. 25, 2013

(54) SYSTEM FOR POWER FACILITY NAVIGATION

(75) Inventors: Jin Ho Shin, Daejeon (KR); Young Il Kim, Daejeon (KR); Bong Jae Lee, Daejeon (KR); Jae Ju Song, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 1218 days.

(21) Appl. No.: 12/341,768

(22) Filed: Dec. 22, 2008

(65) Prior Publication Data

US 2010/0114475 A1 May 6, 2010

(30) Foreign Application Priority Data

Oct. 30, 2008 (KR) .................... 10-2008-0107345

(51) Int. Cl.
*G01C 21/30* (2006.01)
*G06Q 50/06* (2012.01)

(52) U.S. Cl.
USPC .......................................... 701/446; 701/515

(58) Field of Classification Search
USPC .............. 701/420, 422, 445–448, 478.5, 482, 701/515
See application file for complete search history.

(56) References Cited

U.S. PATENT DOCUMENTS

| | | | | | |
|---|---|---|---|---|---|
| 5,214,757 | A | * | 5/1993 | Mauney et al. | 715/751 |
| 5,760,742 | A | * | 6/1998 | Branch et al. | 342/457 |
| 5,794,174 | A | * | 8/1998 | Janky et al. | 701/487 |
| 5,919,245 | A | * | 7/1999 | Nomura | 701/532 |
| 6,574,557 | B2 | * | 6/2003 | Endo | 701/478.5 |
| 6,606,557 | B2 | * | 8/2003 | Kotzin | 701/420 |
| 6,615,135 | B2 | * | 9/2003 | Davies | 701/480 |
| 6,732,077 | B1 | * | 5/2004 | Gilbert et al. | 704/270 |
| 6,836,725 | B2 | * | 12/2004 | Millington et al. | 701/454 |
| 6,859,726 | B2 | * | 2/2005 | Choi | 701/410 |
| 7,171,306 | B2 | * | 1/2007 | Hirose | 701/425 |
| 7,702,459 | B2 | * | 4/2010 | Hoshizaki | 701/478.5 |
| 7,739,138 | B2 | * | 6/2010 | Chauhan et al. | 705/7.14 |

(Continued)

FOREIGN PATENT DOCUMENTS

| | | |
|---|---|---|
| JP | 2004-150824 | 5/2004 |
| JP | 2007010417 A * | 1/2007 |
| JP | 2008022676 A * | 1/2008 |
| KR | 10-0493092 | 5/2005 |

OTHER PUBLICATIONS

JPO machine translation of JP 2007-10417.*

(Continued)

*Primary Examiner* — James Trammell
*Assistant Examiner* — David Testardi
(74) *Attorney, Agent, or Firm* — McDermott Will & Emery LLP

(57) ABSTRACT

A system for power facility navigation is disclosed. For rapid dispatch in the field service including power failure recovery and maintenance, the destination location can be set using various items such as pole numbers, computerization codes, customer names, trade names, equipment numbers and GIS coordinates. Destination location setting and path finding can be performed in order of priorities assigned to these items and in consideration of characteristics of field service activities. Location coordinates are received through a GPS receiver, coordinate conversion is performed according to a facility GIS coordinate system, and map matching is processed when GPS coordinates do not match facility GIS coordinates. The road network database is composed of linear array structures and the structure of a link is configured to include information regarding all other links connected to the start node and end node in a manner that link information and node attributes are integrated together.

15 Claims, 6 Drawing Sheets

U.S. PATENT DOCUMENTS

2002/0188402 A1* 12/2002 Huang et al. ............ 701/213
2008/0114612 A1* 5/2008 Needham et al. ............ 705/1
2008/0120122 A1* 5/2008 Olenski et al. ............ 705/1
2009/0157301 A1* 6/2009 Tien et al. ............ 701/204

OTHER PUBLICATIONS

Yang, D. et al., "An improved map-matching algorithm used in vehicle navigation system", IEEE Intelligent Transportation Systems Proceedings, ITS 2003, Date of Conference: Oct. 12-15, 2003. vol. 2, pp. 1246-1250.*

Renault, S. et al., "GPS/GIS localization using a set membership method", $12^{th}$ Digital Signal Processing Workshop and $4^{th}$ Signal Processing Education Workshop, IEEE, Conference Date: Sep. 24-27, 2006. pp. 168-172.*

Korean Office Action issued in Korean Patent Application No. 10-2008-0107345 dated May 31, 2011.

* cited by examiner

FIG. 4

SYSTEM FOR POWER FACILITY NAVIGATION

BACKGROUND OF THE INVENTION

1. Field of the Invention

The present invention relates to a power facility navigation system that, for rapid dispatch in a power system field service such as failure recovery or maintenance, sets a destination location using computerization codes of power facilities, electric pole numbers, customer names, trade names, addresses, numbers, equipment numbers and facility GIS coordinates, and performs a path-finding operation to guide a field technician in motion to the destination location to thereby shorten dispatch time, failure recovery time and customer power outage time, and enhance the customer support service. Further, the power facility navigation system enables fast path-finding on the basis of a basic map and facility map with a mobile terminal device having a limited capacity and performance, and interworks with a wireless communication network so that various field service activities can be handled in real time in the field.

2. Description of the Related Art

With popularization of in-car terminal devices and precision enhancement of the global positioning system (GPS), navigation systems for navigating the road have become widespread. In the electric power industry, demands are high for power facility navigation systems supporting rapid dispatch in the event of facility failures or maintenance activities. However, most commercially available products employ private data formats without standardization and provide services in static formats on the basis of national base maps, and hence may have difficulty in handling a vast number of spatial objects of power distribution systems and a large amount of attribute information of power facilities. Development of navigation systems requires high-end technologies and experience related to geographic information systems (GIS), which tend to be a target for protection. As the domestic market for navigation in Korea reaches over six millions in number, development of navigation systems specific to electric power systems is not active because of a relatively small market.

As to electric power systems, a facility navigation system is not in use in Korea. In the USA, Georgia Power employs a navigation system that can display a navigation path only in a text mode, not on a GIS map. In Japan, Kyushu Electric Power employs a separate personal digital assistant (PDA) converting map codes, and a commercialized navigator loading the converted map codes to navigate the road. As described above, although the demand is recognized for a power facility navigation system supporting rapid dispatch, failure recovery and facility maintenance, development thereof has been at a standstill owing to difficulty of technology development and limited market size.

BRIEF SUMMARY OF THE INVENTION

The present invention has been made in view of the above problems, and the present invention provides a navigation system that interworks with a power facility mobile GIS engine, and a development method for the same.

Thereto, the present invention applies techniques related to interworking with a mobile GIS engine, processing of spatial objects, finding of paths based on graph theories, processing of GPS coordinates, and map matching. Using spatial and non-spatial data on power facilities and a mobile GIS engine, a destination location is set with respect to a particular power facility and a customer, a path to the destination location is searched for, and GPS location coordinates are converted and matched with power facility GIS data. A physical structure for road network data is newly defined to enable the power facility navigation system to efficiently run on a mobile terminal device with a limited capacity and performance.

In accordance with an embodiment of the present invention, there is provided a system for power facility navigation, including: a power facility navigation processor finding a destination location, and searching for a path; a mobile GIS engine connected to the power facility navigation processor, and performing data processing; a spatial database connected to the mobile GIS engine, and storing basic maps and facility maps; a non-spatial database connected to the mobile GIS engine, and storing property information of facilities and sections; and a road network database connected to the mobile GIS engine, and storing information on roads, wherein the power facility navigation processor includes a destination setting module finding the destination location, a path finding module searching the road network database for a path leading to the destination location, a GPS coordinate processing module receiving location coordinates through a GPS receiver and performing coordinate conversion when different GPS coordinate systems are used, and a map matching module performing GPS coordinate correction.

The destination setting module may set the destination location using at least one of electric pole numbers and computerization codes of power facilities, customer names, trade names, addresses, numbers, equipment numbers and GIS coordinates.

The destination setting module may set the destination location using a selected one of electric pole numbers and computerization codes of power facilities, customer names, trade names, addresses, numbers, equipment numbers and GIS coordinates in order of preset priorities.

The path finding module may retrieve previous coordinates, current coordinates and coordinates of the destination location, search the road network database for the shortest link from the current coordinates and the shortest link to the destination coordinates, and find the shortest path within a search range.

The path finding module may derive a circle that is centered at the middle point of a straight line connecting the current coordinates and destination coordinates and has a radius 1.5 times the distance between the middle point and the current coordinates, and set the search range to the inside of the circle.

The path finding module may set, when the current link at the current coordinates is within the search range and the current link is not equal to the destination link at the destination coordinates, a traveling direction, find connected links leading to the traveling direction, compute, for each connected link, a new accumulated sum of weights by summing a weight of the connected link and currently accumulated sum of weights together, reset the current link to the connected link with the smallest accumulated sum of weights, and perform the next step of path finding.

Weights of the connected links may be set differently according to whether the direction from the current link to the next link corresponds to going straight, turning to the right, turning to the left, or making a U-turn.

The path finding module may terminate path finding when the current link is equal to the destination link.

The GPS coordinate processing module may receive destination coordinates through the GPS receiver, and perform coordinate conversion according to a power facility GIS coordinate system.

The map matching module may shift, when GPS coordinates does not match power facility GIS coordinates, the GPS coordinates within a preset range on the road network, compare the location indicated by the current GPS coordinates with the location computed based on the previous GPS coordinates, traveling speed and traveling direction, and discard, when the difference between the two locations is larger than a preset value, the current GPS coordinates as an outlier.

The map matching module may analyze, for a region with a GPS error larger than a preset value, GPS reception history data, compute the mean of GPS errors, derive a corresponding correction value, and apply the correction value to the coordinates of the region.

The road network database may be composed of linear array structures and the structure of a link may be configured to include information regarding all other links connected to the start node and end node in a manner that link information and node attributes are integrated together.

The road network database may store, for each link, at least one of link identifier, start node identifier, start node attribute, end node identifier, end node attribute, link length, link type, road class code, one-way indicator, lane count, road name, coordinate count, x-coordinates, y-coordinates, start link count, start link index, end link count, and end link index.

The power facility navigation processor may display at least one of status of a modem connecting to a digital TRS or CDMA radio network, status of a GPS receiver, setting of the map direction, setting of a path finding scheme, map scale level, setting of system environment, power facility destination, remaining time and distance, site information related to the current location, traversed path, current location of the car, traveling speed, direction indication, car-centered mode, map movement mode, facility selection mode, and facility attribute.

When a new failure report is received in the car, the power facility navigation processor may split the navigation screen into left and right parts, and display an alert message, a received work list, and details of the failure report.

The power facility navigation processor may display the received work list and a current work list of works in progress, and display, when a failure case is selected from the received work list or current work list, the location associated with the failure case on the map.

The power facility navigation processor may automatically set, when a failure case is moved from the received work list to the current work list, the destination location to the corresponding failure location, and start path finding.

In a feature of the present invention, the power facility navigation system provides functions for identification of a destination location and transit location and for road navigation, and helps to quickly dispatch a field service technician to the destination location, shortening the failure recovery time and enhancing the customer service.

In the event of a high-voltage failure, the power distribution center issues a corresponding equipment number such as an electric pole number or computerization number; a destination location is set using the equipment number; a path to the destination location is searched for; and road navigation in motion is started. In the event of a low-voltage failure reported by a customer to the call center, a mobile maintenance system sends a work order to the corresponding in-car terminal device; a destination is automatically set using coordinates, equipment number or address contained in the work order; and road navigation is started. The destination location may also be set for road navigation using a customer name, trade name, customer address, customer number, and equipment number.

Hence, the power facility navigation system enables instant handling of customer service tasks and shortening of dispatch time and recovery time, and contributes to rapid handling of customer service requests and enhancement of customer service quality along with effective operation of the call center.

BRIEF DESCRIPTION OF THE DRAWINGS

The features and advantages of the present invention will be more apparent from the following detailed description in conjunction with the accompanying drawings, in which:

FIG. 4 illustrates a screen representation for destination setting;

DETAILED DESCRIPTION OF THE INVENTION

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Figure 1:
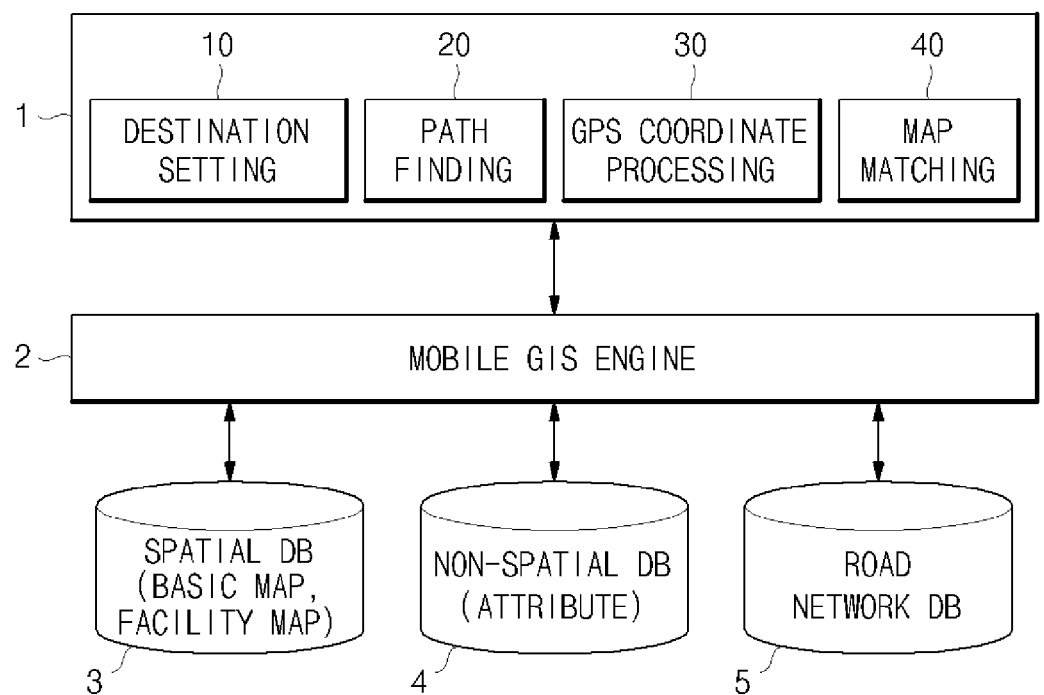
FIG. 1 illustrates a configuration of a power facility navigation system according to an embodiment of the present invention.

FIG. 1 illustrates a configuration of a power facility navigation system according to an embodiment of the present invention. Referring to FIG. 1, the power facility navigation system includes a power facility navigation processor 1, mobile GIS engine 2, spatial database 3 containing basic maps and facility maps, non-spatial database 4, and road network database 5.

In the spatial database 3, facility maps includes information regarding 26 types of power facilities necessary for power facility navigation and field service handling, such as electric poles, transformers, switches, and overhead/underground lines; and basic maps include information regarding roads, buildings, cadastral boundaries, parcel numbers, town boundaries, and office boundaries. The non-spatial database 4 stores property information of facilities and sections. The road network database 5 stores information on roads for path finding and road navigation, such as road types, speeds, directions, coordinates, no left turns/no U-turns, and one-way traffic. The spatial database 3, non-spatial database 4, and road network database 5 are databases that have been reconfigured in a manner suitable to the mobile GIS engine 2 and power facility navigation processor 1.

The mobile GIS engine 2, unlike a GIS engine used in an office, is a compact engine developed in consideration of capacities and performance of mobile terminal devices. The mobile GIS engine 2 includes an interface manager to process graphics according to user events, a loader to load data on the main memory, an object manager to manage four types of spatial objects including points, texts, polylines and polygons for representing spatial data, a layer manager to manage layers being a set of spatial objects, a metadata manager to manage information on objects and tables, a query processor to process a query made through the interface manager, and a spatial index manager to efficiently search for spatial data.

The power facility navigation processor 1 includes a destination setting module 10, path finding module 20, GPS coordinate processing module 30, and map matching module 40. A destination location can be set using electric pole numbers or computerization codes of power facilities, customer names, trade names, addresses, numbers, equipment numbers and GIS coordinates.

The destination setting module 10 finds and sets a destination location in order of priorities assigned to these destination setting items and in consideration of characteristics of field service activities. For example, when a work order from the mobile maintenance system, in response to a low-voltage failure reported by a customer to the call center, is received by the in-car terminal device, the destination setting module 10 searches for the destination location first using failure site GIS coordinates contained in the work order. Then, if GIS coordinates are not present, the destination setting module 10 searches for the destination location using an equipment number associated with failure prediction, customer number, customer address, and nearby address contained in the work order in that order. Here, for destination searching using a nearby address, the least significant digit of the parcel number is increased or decreased by 1 and a comparison is made, and, if not matched, the parcel number is repeatedly modified by deleting the least significant digit and compared with GIS data until a match is found.

The path finding module 20 searches the road network database 5 for a path leading to the set destination location. The GPS coordinate processing module 30 receives location coordinates through a GPS receiver, and performs coordinate conversion if different GPS coordinate systems are used. Currently, the GPS coordinate system is World Geodetic System 84 (WGS84) based on the earth ellipsoid, and the power facility GIS coordinate system is Transverse Mercator™ system. Hence, coordinate conversion is necessary.

The map matching module 40 performs GPS coordinate correction to match GPS coordinates with power facility GIS coordinates. The reason for mismatch is errors in received GPS coordinates and errors in GIS database development. Large GPS errors occur particularly in the vicinity of a high-rise building with glass walls. Error correction can be made in the following ways. First, the GPS coordinates can be shifted within a preset range on the road network. Second, the location indicated by the current GPS coordinates is compared with the location computed based on the previous GPS coordinates, and traveling speed and traveling direction, and, if the difference between the two locations is larger than a preset value, the current GPS coordinates are discarded as an outlier. Finally, for regions or roads with large GPS errors, GPS reception history data is analyzed, the mean error values are derived, and separate correction values are applied for different regions.

Figure 2:
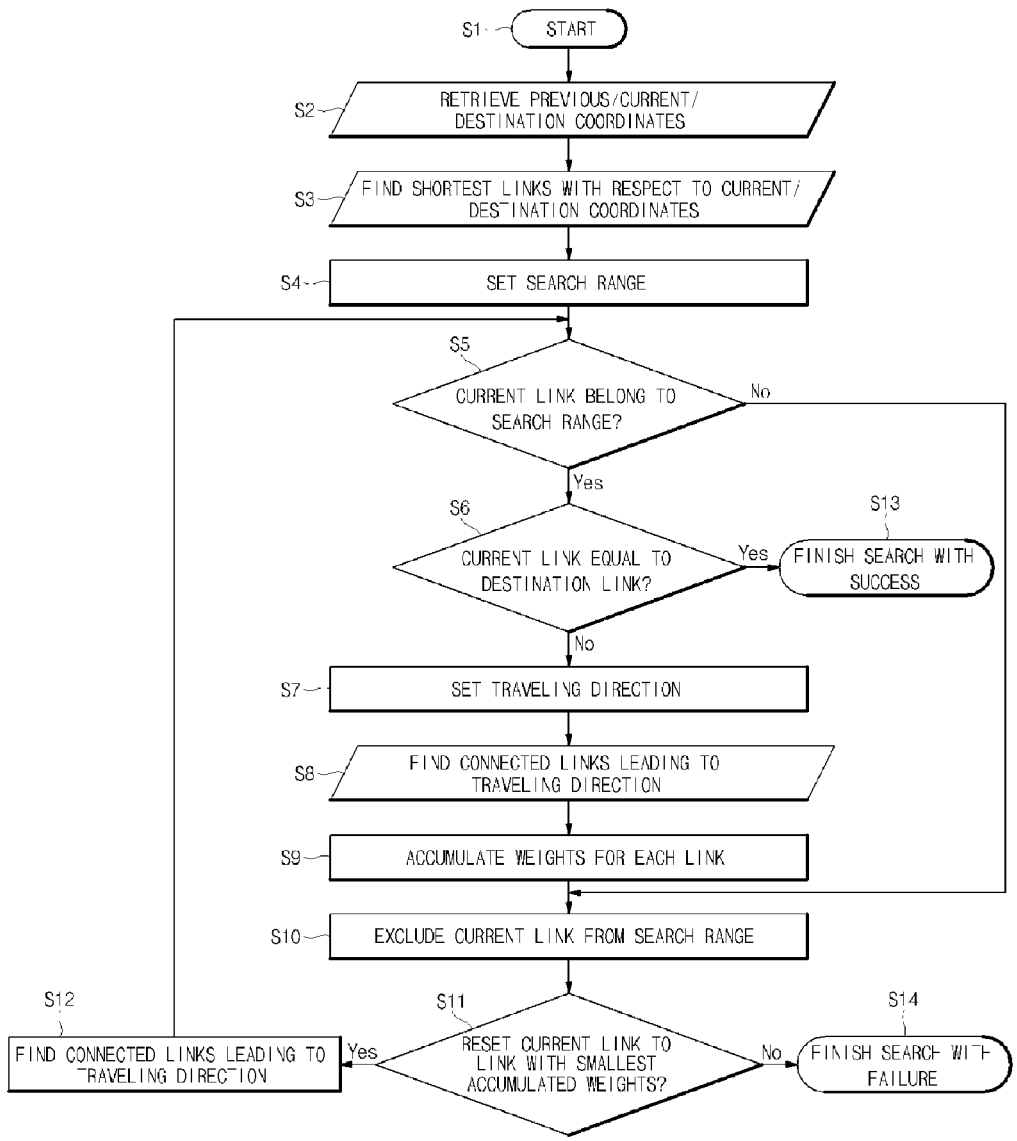
FIG. 2 is a flow chart illustrating a procedure of path finding.

FIG. 2 is a flow chart illustrating a procedure of path finding for power facility navigation. Path finding is based on a graph theory. A graph is composed of vertices (nodes) and edges (links), and is used to represent and analyze relations or connections between elements. In a graph representing a road network for navigation, weights are assigned to links. For path finding on a graph, Dijkstra, Floyd-Warshall, Bellman-Ford, and A* search algorithms may be used. The Dijkstra algorithm, which finds the optimal path by checking all possible paths, is adapted for search speed enhancement and the adapted version is employed in the present invention.

Referring to FIG. 2, when a search for a path is initiated (S1), previous GPS coordinates, current GPS coordinates, and coordinates of the destination location are retrieved (S2). Here, the previous GPS coordinates includes five sets of coordinates received in the past (not a single set of coordinates) to compute the traveling direction and traveling speed. The shortest link from the current location (current link) and the shortest link to the destination location (destination link) are found from the road network database 5 (S3), and a search range is set (S4). The search range is set by a circle, centered at the middle point of a straight line connecting the current location and destination location, with a radius 1.5 times the distance between the middle point and the current location (or destination location). When the radius of a search range is less than 2 km, it may be difficult to find detours. Hence, the search range may be reset with an extended radius.

If the current link is within the search range (S5) and the current link is not equal to the destination link (S6), the traveling direction is set through calculating the angle formed by the previous coordinates and current coordinates (S7), connected links leading to the traveling direction are found (S8), for each connected link a new accumulated sum of weights is computed by summing the weight of the connected link and currently accumulated sum of weights together (S9), and the current link is excluded from the search range because it is already traversed (S10). If one of the connected links with the smallest accumulated sum of weights is present (S11), the current link is set to the connected link with the smallest accumulated sum of weights for the continued search (S12). In this process, weights of individual links are values set in advance according to whether the direction from the current link to the next link corresponds to going straight, turning to the right, turning to the left, or making a U-turn. A relatively small weight is assigned to a link in the front direction so that the link is selected first to reach the destination link. On the other hand, when the current link is out of the search range, the current link is excluded from the search process. Absence of a connected link with the smallest accumulated sum of weights indicates a disconnection between the current link and destination link, i.e., search failure (S14). Equality of the current link to the destination link indicates the success of finding the shortest path, and hence the search is ended (S13).

Figure 3:
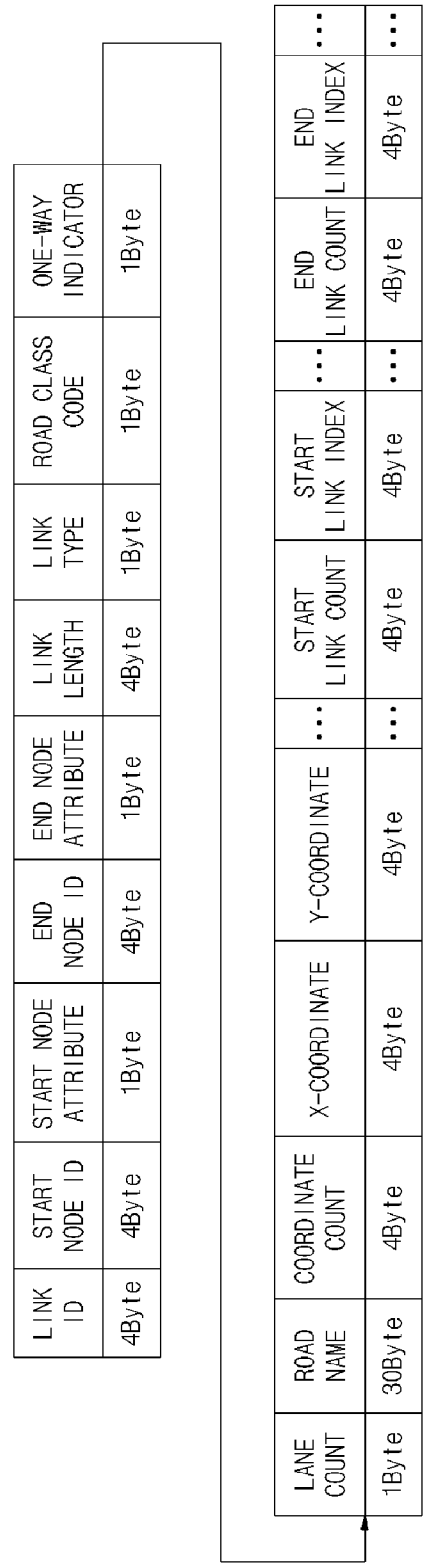
FIG. 3 illustrates a physical data structure for a road network.

FIG. 3 illustrates a physical data structure of the road network database 5. Compared to a desktop computer, a mobile terminal device has a limited capacity and a low performance. The physical storage structure of the road network database 5 may have significant influence on the performance. In the present invention, an enhanced linear array structure is designed to increase path-finding speed and storage efficiency instead of using an existing matrix array structure. In addition, nodes and links are not managed using separate arrays but are integrated in a single entity to thereby reduce the burden of input-and-output and paging and increase processing speed.

Referring to FIG. 3, the structure of a link is configured to include information regarding all other links connected to the start node and end node in a manner that link information and node attributes are integrated together. As the amount of information on connected links is variable, a pointer array is utilized. When information on a link is physically stored, an index to a pointer array storing other links connected to the start node and end node of the link is stored in an integer array. Then, the index stored in the integer array is used to refer to the stored link information. In the link structure, the 'start node attribute' and 'end node attribute' indicate one of road intersection, lane change, end of road, province boundary, U-turn, railroad crossing, toll gate, and road crossing. The 'length' indicates the length of the link, and the 'link type' indicates one of main road, access road, passage of road intersection, within rotary, U-turn, and P-turn. The 'road class code' indicates one of express way, national road, local road, and narrow path. A road is a polyline, and the 'coordinate count' indicates the number of x-coordinates and y-coordinates. The 'start link count' indicates the number of links connected to the start node, and the 'end link count' indicates the number of links connected to the end node. Hence, the 'start link index' and 'end link index' are repeated accordingly.

For fast traversal of these structures, an index array is created, and only this index array is loaded on the memory and used during path finding. In a given network structure, link IDs are sequentially stored in a pointer array, and an index to the pointer array is stored in an integer array. For searching, the index to the pointer array is referenced and stored in the integer array, and link information stored in the pointer array is referenced using the index stored in the integer array.

Figure 4:
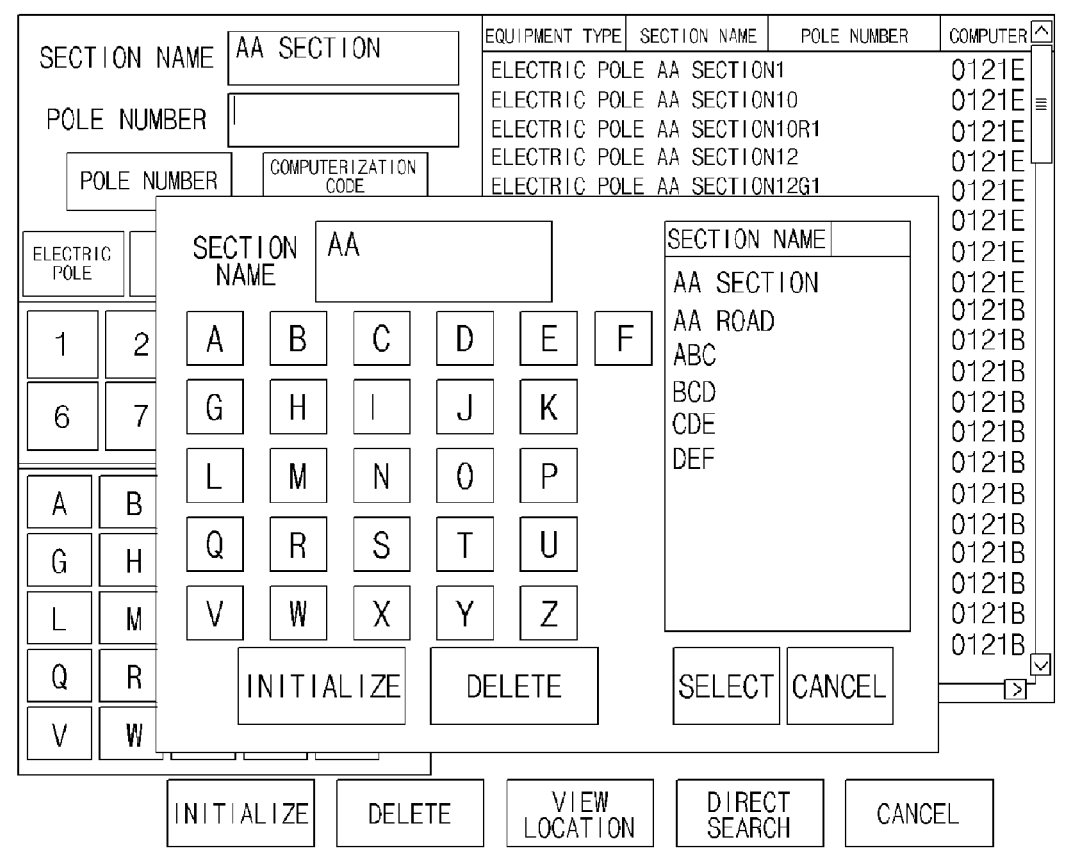

FIG. 4 illustrates a screen representation for destination setting. A destination location can be set using electric pole numbers or computerization codes of power facilities, customer names, trade names, addresses, numbers, equipment numbers and GIS coordinates. In FIG. 4, a destination location is set using electric pole numbers or computerization codes of power facilities. That is, a 'section name' is selected using an initial stroke matching function; a part of an electric pole number or computerization code composed of alphanumeric characters is input for selection; and the 'location view' button can be pressed to check the location on a GIS map and then the destination location can be set, or the 'direct search' button can be pressed to set the destination location for immediate road navigation.

Figure 5:
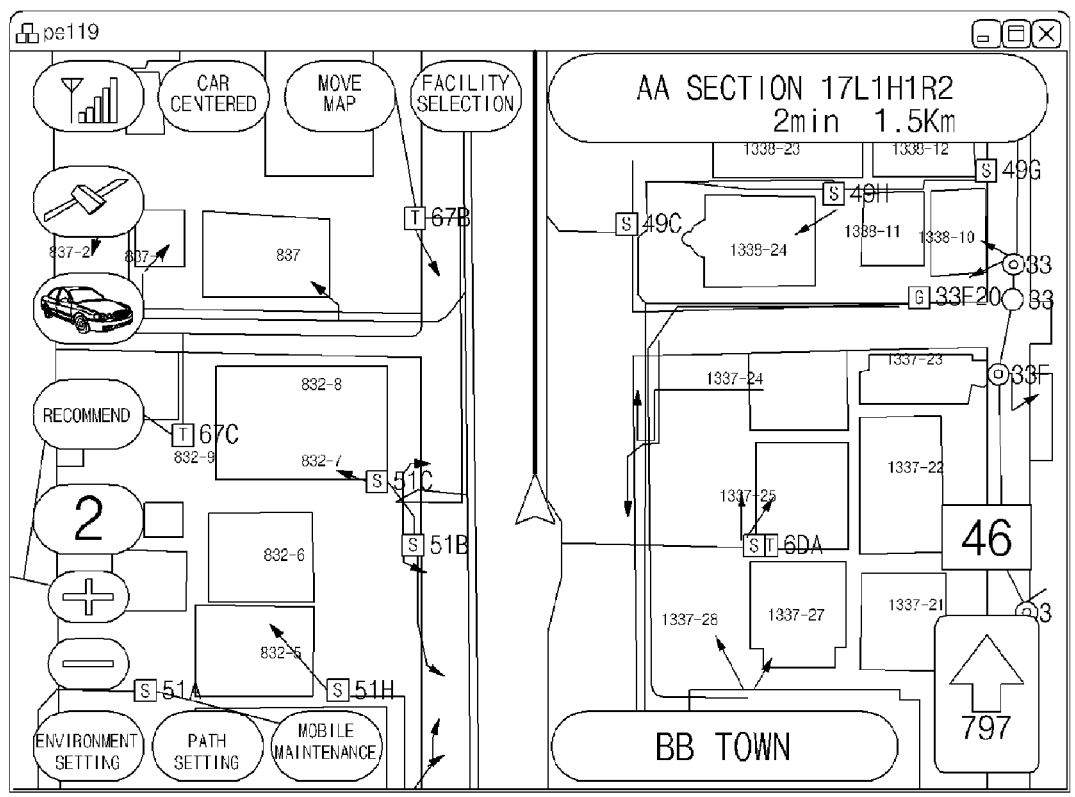
FIG. 5 illustrates a screen representation for road navigation.

FIG. 5 illustrates a screen representation for road navigation. In the screen of FIG. 5, various icons are arranged from the top to bottom in the left to indicate, respectively, the status of a modem connecting to a digital Trunked Radio System (TRS) or Code Division Multiple Access (CDMA) radio network, the status of a GPS receiver, setting of the map direction to the traveling direction of the car or to the default direction, setting of path finding to a recommended path or to the shortest path, one of twelve scale levels, enlargement/reduction of the map, and setting of system environment involving voice guidance/night map/scale-related layer. In the top right, the set destination, remaining time and distance are displayed. Site information related to the current location is displayed in the bottom right, and the current location of the car is displayed along with found paths in the middle of the screen. While in motion, the traveling speed, marks for left turn/right turn/U-turn, remaining distance, and voice guidance are provided. On the GIS map, the basic map and facility map are displayed together, and selecting a facility in a facility selection mode causes attribute information of the selected facility to be displayed.

Figure 6:
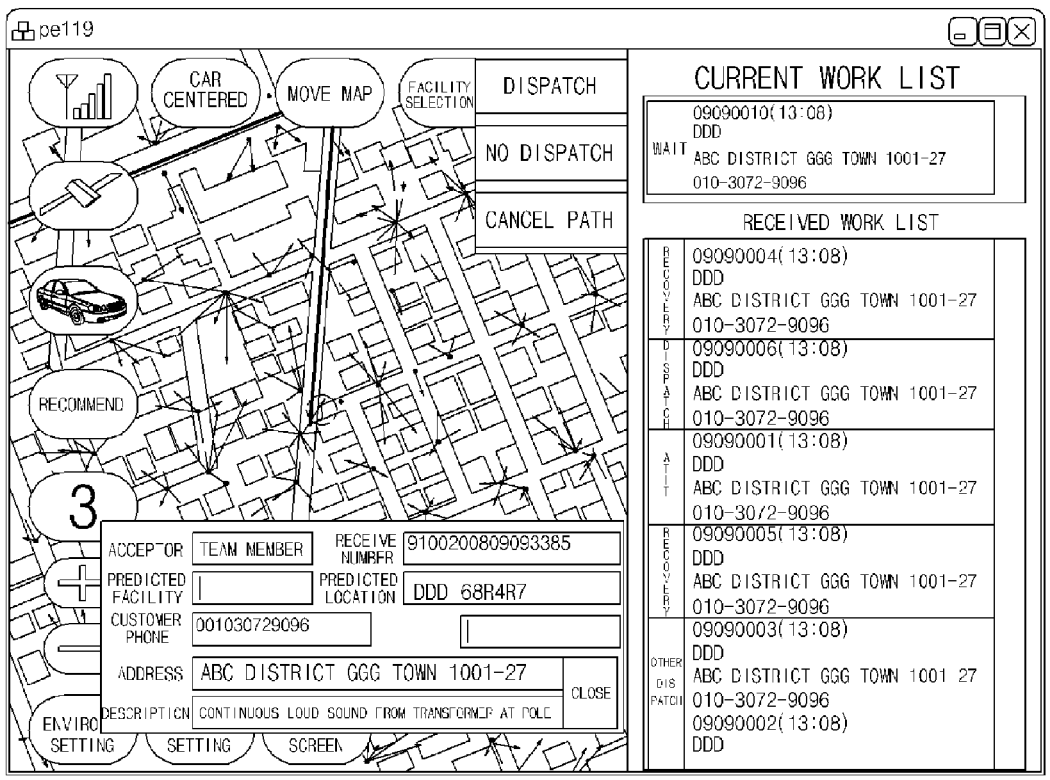
FIG. 6 illustrates a screen representation for handling a failure recovery request in the power facility navigation system.

FIG. 6 illustrates a screen representation for handling a failure recovery request in the power facility navigation system. Referring to FIG. 6, when a new failure report is received in the car, the navigation screen is split into left and right parts, and a received work list and details of the failure report are displayed along with an alert message. After a failure case is selected from the received work list or current work list, the location associated with the failure case is displayed on the map and buttons for handling the failure case are popped up according to the work status. When a failure case is moved from the received work list to the current work list, the corresponding failure location is automatically set as the destination location and path finding is performed to initiate road navigation.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A system for power facility navigation, comprising:
    a processor configured to find a destination location and search for a path;
    a mobile GIS engine connected to the processor and configured to perform data processing;
    a spatial database connected to the mobile GIS engine and configured to store basic maps and power facility maps;
    a non-spatial database connected to the mobile GIS engine and configured to store property information of power facilities and sections; and
    a road network database connected to the mobile GIS engine and configured to store information on roads as a road network,
    wherein the processor comprises:
    a destination setting module configured to find the destination location with a plurality of destination setting items having respective preset priorities assigned thereto, such that the destination setting items are compared with GIS data in order of the preset priorities until a match is found,
    a path finding module configured to search the road network database for a path leading to the destination location,
    a GPS coordinate processing module configured to receive location coordinates through a GPS receiver and perform coordinate conversion between different coordinate systems, and
    a map matching module configured to perform GPS coordinate correction.

2. The system of claim 1, wherein the destination setting items include electric pole numbers of power facilities, computerization codes of power facilities, customer names, trade names, addresses, numbers, equipment numbers and GIS coordinates.

3. The system of claim 1, wherein:
    the path leading to the destination location includes a set of links, from among a plurality of links, each of the plurality of links connecting two locations, and
    the path finding module is configured to: determine current coordinates and coordinates of the destination location, search the road network database for a shortest link connected from the current coordinates and a shortest link connected to the destination coordinates, and find the path leading to the destination location within a search range.

4. The system of claim 3, wherein the path finding module is configured to derive a circle that is centered at the middle point of a straight line connecting the current coordinates and the destination coordinates and has a radius 1.5 times the distance between the middle point and the current coordinates, and set the search range to the inside of the circle.

5. The system of claim 3, wherein the path finding module is configured to:
    set, when a current link at the current coordinates is within the search range and the current link is not equal to a destination link at the destination coordinates, a traveling direction based on multiple sets of previous coordinates, find connected links leading to the traveling direction, compute, for each connected link, a new accumulated sum of weights by summing a weight of the connected link and a currently accumulated sum of weights together, reset the current link to the connected link, and perform a next step of path finding.

6. The system of claim 5, wherein weights of the connected links are set differently according to whether the direction from the current link to the next link corresponds to going straight, turning to the right, turning to the left, or making a U-turn.

7. The system of claim 5, wherein the path finding module is configured to terminate path finding when the current link is equal to the destination link.

8. The system of claim 1, wherein the GPS coordinate processing module is configured to:

receive destination coordinates through the GPS receiver, and perform a coordinate conversion according to a power facility GIS coordinate system.

9. The system of claim 1, wherein:

the road network database is composed of linear array structures including a plurality of nodes and a plurality of links, each of the plurality of links connecting a start node and an end node, and the structure of each link includes information regarding all other links, among the plurality of links, that are connected to the start node and end node, in a manner that link information and node attributes are integrated together.

10. The system of claim 9, wherein the road network database stores, for each link, at least one of link identifier, start node identifier, start node attribute, end node identifier, end node attribute, link length, link type, road class code, one-way indicator, lane count, road name, coordinate count, x-coordinates, y-coordinates, start link count, start link index, end link count, and end link index.

11. The system of claim 1, wherein the processor is configured to display at least one of status of a modem connecting to a digital TRS or CDMA radio network, status of a GPS receiver, setting of the map direction, setting of a path finding scheme, map scale level, setting of system environment, power facility destination, remaining time and distance, site information related to the current location, traversed path, current location of the car, traveling speed, direction indication, car-centered mode, map movement mode, facility selection mode, and facility attribute.

12. The system of claim 1, wherein when a new failure report is received in the car, the processor is configured to:

split the navigation screen into left and right parts, and display an alert message, a received work list, and details of the failure report.

13. The system of claim 12, wherein the processor is configured to display the received work list and a current work list of works in progress, and display, when a failure case is selected from the received work list or current work list, the location associated with the failure case on the map.

14. The system of claim 13, wherein the processor is configured to automatically set, when a failure case is moved from the received work list to the current work list, the destination location to the corresponding failure location, and start path finding.

15. The system of claim 1, wherein:

the destination setting items include an address including a parcel number, and the destination setting module is configured to increase or decrease the parcel number by 1 and compare the parcel number with GIS data, repeatedly, until a match is found.

* * * * *